United States Patent
Cudak et al.

(10) Patent No.: US 9,304,515 B2
(45) Date of Patent: Apr. 5, 2016

(54) REGIONAL OPERATION MODES FOR AUTONOMOUS VEHICLES

(71) Applicant: LENOVO ENTERPRISE SOLUTIONS (SINGAPORE) PTE. LTD., Singapore (SG)

(72) Inventors: Gary D. Cudak, Wake Forest, NC (US); Christopher J. Hardee, Raleigh, NC (US); Adam Roberts, Moncure, NC (US); Adrian X. Rodriguez, Durham, NC (US)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 44 days.

(21) Appl. No.: 14/260,325

(22) Filed: Apr. 24, 2014

(65) Prior Publication Data
US 2015/0309512 A1    Oct. 29, 2015

(51) Int. Cl.
G05D 1/00 (2006.01)
G06G 7/48 (2006.01)
G05D 1/02 (2006.01)

(52) U.S. Cl.
CPC .............. G05D 1/0287 (2013.01); G05D 1/021 (2013.01)

(58) Field of Classification Search
USPC ................................................. 701/23; 703/8
See application file for complete search history.

(56) References Cited

U.S. PATENT DOCUMENTS

| | | | |
|---|---|---|---|
| 5,170,352 A | 12/1992 | McTamaney et al. | |
| 5,436,839 A | 7/1995 | Dausch et al. | |
| 6,142,252 A | 11/2000 | Kinto et al. | |
| 6,151,539 A * | 11/2000 | Bergholz et al. | 701/25 |
| 7,565,230 B2 | 7/2009 | Gardner et al. | |
| 7,660,459 B2 | 2/2010 | Busche | |
| 7,974,460 B2 | 7/2011 | Elgersma | |
| 7,979,174 B2 | 7/2011 | Fregene et al. | |
| 8,457,827 B1 | 6/2013 | Ferguson et al. | |
| 8,473,144 B1 * | 6/2013 | Dolgov et al. | 701/28 |
| 8,634,980 B1 * | 1/2014 | Urmson et al. | 701/23 |
| 8,874,301 B1 * | 10/2014 | Rao et al. | 701/25 |

(Continued)

FOREIGN PATENT DOCUMENTS

| WO | 2013/069054 A1 | 5/2013 |
|---|---|---|
| WO | 2013/076829 A1 | 5/2013 |

OTHER PUBLICATIONS

Hemmerstoffer, Steve, "Autonomous Car Driving through heavy City Traffic (video)", uploaded on Oct. 10, 2010, provided in disclosure on Sep. 28, 2013, <http://www.youtube.com/watch?v=BrmorE5W1tM>.

(Continued)

*Primary Examiner* — Thomas G Black
*Assistant Examiner* — Tyler Paige
(74) *Attorney, Agent, or Firm* — Edward J. Lenart; Katherine S. Brown; Kennedy Lenart Spraggins LLP

(57) ABSTRACT

A computer receives data detailing operation of a plurality of at least partially manually operated automobiles. The computer determines one or more trends in the operation of the plurality of at least partially manually operated automobiles, based at least in part on the data detailing the operation of the plurality of manually operated vehicles. The computer generates one or more operational rules, based, at least in part, on the one or more trends. The computer transmits the one or more operational rules to one or more at least semi-autonomous vehicles.

20 Claims, 4 Drawing Sheets

(56) References Cited

U.S. PATENT DOCUMENTS

| | | | |
|---|---|---|---|
| 9,097,549 B1* | 8/2015 | Rao et al. | |
| 2002/0143461 A1* | 10/2002 | Burns et al. | 701/117 |
| 2004/0115597 A1 | 6/2004 | Butt | |
| 2004/0133341 A1 | 7/2004 | Spriggs | |
| 2004/0193349 A1* | 9/2004 | Flann et al. | 701/50 |
| 2005/0116829 A1 | 6/2005 | Koenig et al. | |
| 2005/0178602 A1 | 8/2005 | Bolduc et al. | |
| 2007/0001831 A1 | 1/2007 | Raz et al. | |
| 2007/0193798 A1* | 8/2007 | Allard et al. | 180/169 |
| 2008/0027590 A1 | 1/2008 | Phillips et al. | |
| 2008/0059007 A1* | 3/2008 | Whittaker et al. | 701/2 |
| 2008/0086241 A1 | 4/2008 | Phillips et al. | |
| 2010/0063652 A1 | 3/2010 | Anderson | |
| 2010/0063664 A1 | 3/2010 | Anderson | |
| 2010/0066587 A1 | 3/2010 | Yamauchi et al. | |
| 2010/0094499 A1 | 4/2010 | Anderson | |
| 2010/0106356 A1* | 4/2010 | Trepagnier et al. | 701/25 |
| 2010/0198488 A1* | 8/2010 | Groitzsch et al. | 701/117 |
| 2010/0201829 A1 | 8/2010 | Skoskiewicz et al. | |
| 2010/0256852 A1* | 10/2010 | Mudalige | 701/24 |
| 2012/0083960 A1* | 4/2012 | Zhu et al. | 701/23 |
| 2012/0101660 A1 | 4/2012 | Hattori | |
| 2012/0215641 A1 | 8/2012 | Ohki | |
| 2012/0233102 A1* | 9/2012 | James | 706/14 |
| 2012/0310465 A1* | 12/2012 | Boatright et al. | 701/25 |
| 2013/0024060 A1 | 1/2013 | Sukkarié et al. | |
| 2013/0158795 A1 | 6/2013 | Hahne | |
| 2014/0121880 A1* | 5/2014 | Dolgov et al. | 701/23 |
| 2014/0195214 A1* | 7/2014 | Kozloski et al. | 703/8 |
| 2015/0012167 A1* | 1/2015 | Wolter | 701/23 |

OTHER PUBLICATIONS

James, Leon Dr., "Principles of Driving Psychology", Professor of Psychology, University of Hawaii, 1996-2007, provided in disclosure on Sep. 28, 2013, <http://www.drdriving.org/articles/driving_psy.htm>.

Lavrinc, Damon, "Google's Eric Schmidt: Our autonomous cars drive better than you . . . when you're drunk", Autoblog, © Copyright 2014 AOL Inc., provided in disclosure on Sep. 28, 2013,<http://www.autoblog.com/2011/09/29/googles-eric-schmidt-our-autonomous-cars-drive-better-than-you/>.

Markoff, John, "Smarter Than You Think Google Cars Drive Themselves, in Traffic", NYTimes.com, Copyright 2010 The New York Times Company, provided in disclosure on Sep. 28, 2013,<http://www.nytimes.com/2010/10/10/science/10google.html>.

Shirley, Nat, "Google's autonomous car target: 1M accident-free miles", New and Used Car Reviews, Research & Automotive-Industry News & LeftLaneNews, Copyright © 2005-2013 MNM Media, LLC., provided in disclosure on Sep. 28, 2013,<http://www.leftlanenews.com/googles-autonomous-car-target-1m-accident-free-miles.html>.

Silver et al., "Learning Autonomous Driving Styles and Maneuvers from Expert Demonstration", Carnegie Mellon University, pp. 1-15, International Symposium on Experimental Robotics, Jun. 2012, <http://www.ri.cmu.edu/publication_view.html?pub_id=7225>.

"Algeria", Wikitravel, The Free Travel Guide, this page was last modified on Jan. 2, 2014, at 07:06, provided in disclosure on Sep. 28, 2013, <http://wikitravel.org/en/Algeria>.

"Autonomous car", Wikipedia, the free encyclopedia, this page was last modified on Jan. 29, 2014, at 19:23, provided by inventors in disclosure Aug. 29, 2013, <http://en.wikipedia.org/wiki/Autonomous_car>.

"Bad habits create bad accidents", Drive Alive™, provided by inventors in disclosure Aug. 29, 2013, <http://www.allencountydrivealive.org/Bad%20Habits.htm>.

"California Driving: Bad Habits (and Worse)", California Driving Guide: Californian Driving Habits and Quirks, Text and images Copyright © 2012 Hamish Reid, Oakland,California, provided in disclosure on Sep. 28, 2013, <http://www.caldrive.com/habits.html>.

"Facial Expression Recognition Software", Emotient Products, © Copyright 2014 Emotient, Inc., provided in post disclosure on Aug. 29, 2013, <http://www.emotient.com/products>.

"Google wants autonomous vehicles on streets in 3-5 years", TG Daily, Posted Feb. 11, 2103—10:43 by Thomas Anderson, provided by inventors in disclosure Aug. 29, 2013, <http://www.tgdaily.com/general-science-brief/69409-google-wants-autonomous-vehicles-on-streets-in-3-5-years#uxstwwDr7s1aQqqM.99 >.

"Michigan Could Approve Autonomous Vehicle Licensing as Soon as This Week", DailyTech, Tiffany Kaiser—Apr. 17, 2013 12:47 AM, provided by inventors in disclosure Aug. 29, 2013, <http://www.dailytech.com/Michigan+Could+Approve+Autonomous+Vehicle+Licensing+as+Soon+as+This+Week/article30364.htm>.

"Musk says Tesla is at work on autopilot feature", CNN Money, by James O'Toole @jotoole Sep. 18, 2013: 7:16 PM ET, provided by inventors in disclosure Aug. 29, 2013, <http://money.cnn.com/2013/09/18/autos/tesla-autopilot-musk/index.html>.

"Regional bad driving habits", Fuel Economy, Hypermiling, EcoModding News and Forum—EcoModder.com, Copyright © 2000-2014, vBulletin Solutions, Inc., provided in disclosure on Sep. 28, 2013, <http://ecomodder.com/forum/showthread.php/regional-bad-driving-habits-14430-3.html>.

"Regional differences (best, truck, drivers, Texas)—Sports cars, sedans, coupes, SUVs, trucks, motorcycles, tickets, dealers, repairs, gasoline, drivers . . . —City-Data Forum", provided in disclosure on Sep. 28, 2013, © 2005-2014, Advameg, Inc., <http://www.city-data.com/forum/automotive/889008-regional-differences.html>.

"Straight Dope Message Board", vBulletin® v3.7.3, Copyright © 2000-2014, Jelsoft Enterprises Ltd., provided in disclosure on Sep. 28, 2013, <http://boards.straightdope.com/sdmb/archive/index.php/t-131258.html>.

"Traffic psychology", Wikipedia, the free encyclopedia, this page was last modified on Aug. 20, 2013, at 12:59, provided by inventors in disclosure Aug. 29, 2013, <http://en.wikipedia.org/wiki/Traffic_psychology>.

* cited by examiner

REGIONAL OPERATION MODES FOR AUTONOMOUS VEHICLES

FIELD OF THE INVENTION

The present invention relates generally to the field of autonomous vehicles, and more particularly to modifying the operation of autonomous vehicles based on geographic driving trends.

BACKGROUND OF THE INVENTION

Autonomous vehicles are automobiles that have the ability to operate and navigate without human input. Autonomous vehicles use sensors, such as radar, LIDAR, global positioning systems, and computer vision to detect the vehicle's surroundings. Advanced computer control systems interpret the sensory input information to identify appropriate navigation paths, as well as obstacles and relevant signage. Some autonomous vehicles update map information in real time to remain aware of the vehicle's location even if conditions change or the vehicle enters an uncharted environment. Autonomous vehicles increasingly communicate with remote computer systems via wireless network connections and with one another using dedicated short range communications (DSRC).

Driving habits vary by region. For example, acceptable speeds in excess of the speed limit depend on the region and driving conditions, or amount of space left between cars traveling on a busy road. Many of these habits are learned behaviors, and other drivers in the region expect those cars around them to operate according to the regional standards.

SUMMARY

A computer receives data detailing operation of a plurality of at least partially manually operated automobiles. The computer determines one or more trends in the operation of the plurality of at least partially manually operated automobiles, based at least in part on the data detailing the operation of the plurality of manually operated vehicles. The computer generates one or more operational rules, based, at least in part, on the one or more trends. The computer transmits the one or more operational rules to one or more at least semi-autonomous vehicles.

DETAILED DESCRIPTION

Embodiments of the present invention recognize that regional driving habits pose a potential hazard to both drivers and passengers as the number of autonomous vehicles operating on roadways increases. Drivers in a particular region expect those around them to abide by the regional driving norms, and deviation from the expected behaviors can cause unsafe conditions. For example, an autonomous vehicle that does not merge as expected can cause other automobiles in the immediate area to need to swerve or brake unexpectedly in order to avoid a collision, which in turn can lead to more unsafe behavior. As a result, embodiments of the present invention recognize that autonomous vehicles with the ability to adapt to regional driving preferences results in safer roadways for passengers in the autonomous vehicle and motorists operating nearby vehicles.

Figure 1:
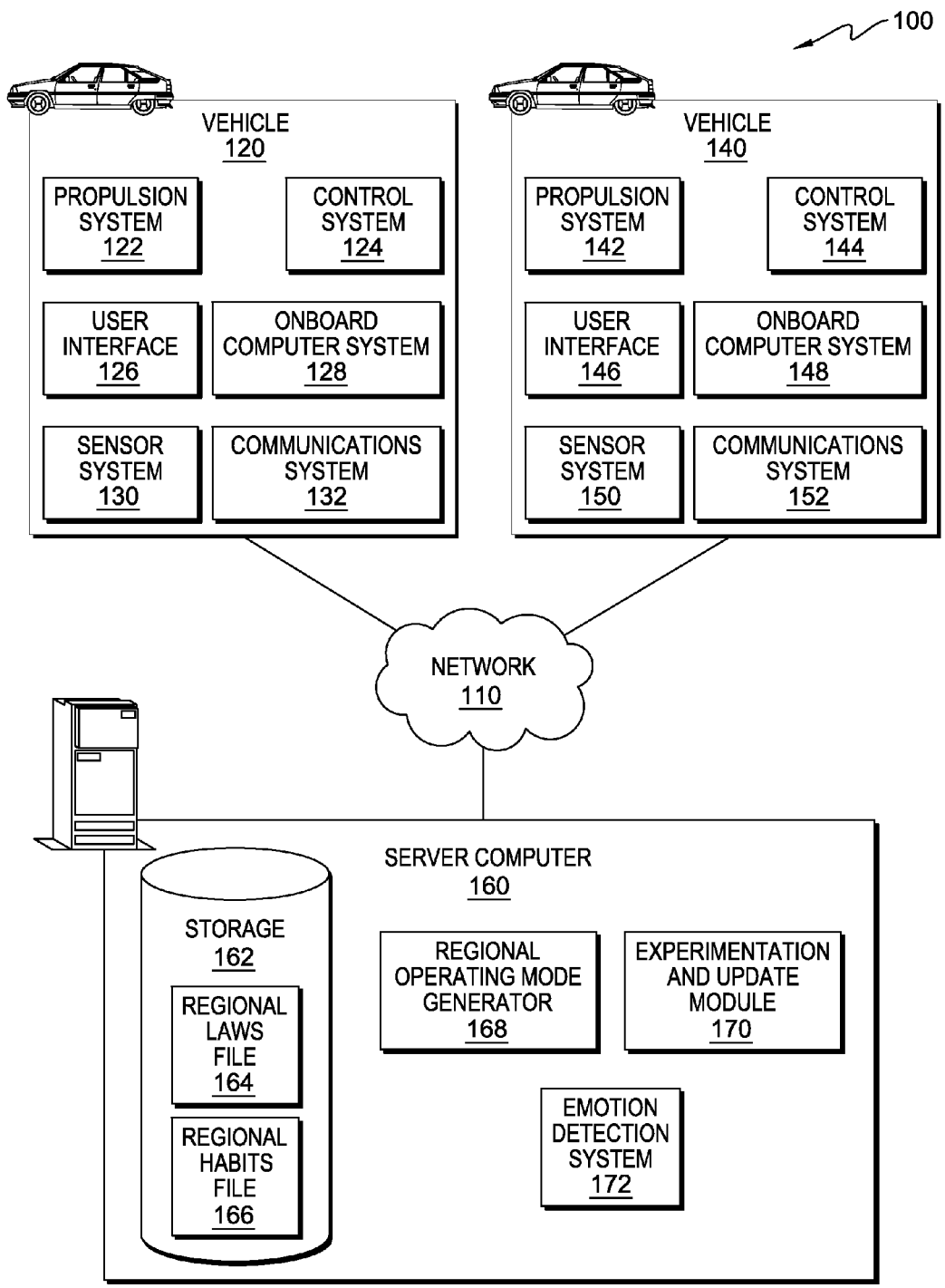
FIG. 1 is a functional block diagram illustrating an autonomous vehicle environment, in accordance with an embodiment of the present invention.

The present invention will now be described in detail with reference to the Figures. FIG. 1 is a functional block diagram illustrating an autonomous vehicle environment ("environment"), generally designated 100, in accordance with an embodiment of the present invention. Environment 100 includes vehicles 120 and 140 and server computer 160, all interconnected over network 110. Network 110 can be, for example, a local area network (LAN), a wide area network (WAN), such as the Internet, a dedicated short range communications network, or any combination thereof, and may include wired, wireless, fiber optic, or any other connection known in the art. In general, the communication network can be any combination of connections and protocols that will support communication between vehicle 120, vehicle 140, and server computer 160, in accordance with an embodiment of the present invention.

Vehicles 120 and 140 are motorized vehicles operating within a defined regional boundary. In various embodiments of the present invention, vehicles 120 and 140 can be autonomous, semi-autonomous, or manually operated, or a combination thereof. In one embodiment, vehicle 120 represents a plurality of autonomous vehicles operating within a defined regional boundary, and vehicle 140 represents a plurality of manually operated vehicles operating within the same regional boundary. In various embodiments, vehicles 120 and 140 include propulsion systems 122 and 142, control systems 124 and 144, user interfaces 126 and 146, onboard computer systems 128 and 148, sensor systems 130 and 150, and communications systems 132 and 152, respectively.

Propulsion systems 122 and 142 include components operable to provide powered motion to vehicles 120 and 140, respectively. In various embodiments, propulsion systems 122 and 142 can include an engine/motor, an energy source, a transmission, and/or wheels/tires. The engine/motor can be any combination of an internal combustion engine, an electric motor, a steam engine, a Stirling engine, or other types of engines/motors. In some embodiments, propulsion systems 122 and 142 can include multiple types of engines and/or motors, such as, a gas-electric hybrid car. The energy source can be, for example, gasoline, diesel, other petroleum-based fuels, propane, other compressed gas-based fuels, ethanol, solar panels, and/or batteries. In various embodiments, the transmission can include a gearbox, clutch, differential, and drive shafts.

Control systems 124 and 144 are collections of mechanical, electro-mechanical, and electronic systems that can be configured to control the operations of vehicles 120 and 140, respectively. In various embodiments, control systems 124 and 144 can each include a steering unit, a throttle, a brake unit, and/or a navigation system. In an embodiment, the steering unit can be a mechanism that can control the heading and/or turning of the vehicle. In one embodiment, the throttle can be configured to control the operating speed of the engine/motor and, in turn, the speed of the vehicle. In some embodiments, the brake unit can include any combination of mechanisms configured to decelerate the vehicle. The brake unit can use, for example, friction to slow the rotation of the tires/wheels. In some embodiments, the brake unit converts kinetic energy of the wheels/tires into electrical current. In various embodiments, the navigation system can be any system configured to determine a driving path for the vehicle. In some embodiments, the navigation system receives input information from the GPS and camera systems included in sensor systems 130 or 150 in order to generate the driving path for the vehicle.

User interfaces 126 and 146 are mechanisms by which a passenger in vehicles 120 and 140, respectively, can interact with the vehicle. User interfaces 126 and 146 can include, buttons, knobs, levers, pedals, paddles, and/or any other type of user interface, such as a touchscreen display capable of detecting the location and/or movement of a user's finger. The touchscreen can be, for example, a capacitive sensing screen, a resistance sensing screen, or a surface acoustic wave sensing screen.

Onboard computer systems 128 and 148 are computing systems, including at least one computer processor, that are capable of controlling one or more functions of vehicles 120 and 140, respectively, based on inputs received from one or more of the systems included in the vehicle. For example, in an embodiment, onboard computer system 128 can control propulsion system 122 based on inputs received from sensor system 130.

Sensor systems 130 and 150 include any number of sensors configured to detect information about vehicles 120 and 140, respectively, and their surrounding environment. In various embodiments, sensor systems 130 and 150 can include a global positioning system (GPS), an inertial measurement unit (IMU), a RADAR unit, a LIDAR unit, and/or a camera. The GPS can be any sensor configured to estimate a geographic location. The IMU can be any combination of sensors configured to sense position and orientation changes in a vehicle based on inertial acceleration. The RADAR unit can be any system that uses radio signals to sense objects within the local environment of a vehicle. In various embodiments, the RADAR unit can also detect relative motion between the vehicle and the vehicle's surroundings. The LIDAR unit can be any system configured to sense objects in the vehicle's environment using one or more lasers. The camera can include one or more devices configured to capture a plurality of images of the environment of a vehicle. The camera can be a still or a video camera and may record visible and/or infrared light.

Communications systems 132 and 152 can be any system configured to communicate with one or more devices directly or via network 110. In various embodiments, communications systems 132 and 152 can include a transmitter and a receiver for sending and receiving electromagnetic waves, respectively, such as an antenna.

Server computer 160 can be a desktop computer, a laptop computer, a tablet computer, a specialized computer server, a smartphone, or any other computer system known in the art. In certain embodiments, server computer 160 represents a computer system utilizing clustered computers and components that act as a single pool of seamless resources when accessed through network 110, as is common in data centers and with cloud computing applications. In general, server computer 160 is representative of any programmable electronic device or combination of programmable electronic devices capable of executing machine-readable program instructions and communicating with other computing devices via a network. Exemplary components of server computer 160 are described in greater detail with regard to FIG. 4. Server computer 160 includes storage 162, regional operating mode generator 168, experimentation and update module 170, and emotion detection system 172. Storage 162 includes regional laws file 164 and regional habits file 166.

Storage 162 is a computer readable storage device that maintains information detailing regional traffic laws and regional driving habits. In various embodiments, storage 162 can be a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Regional laws file 164 is a collection of information describing various traffic laws for one or more driving regions. Regional laws file can include information on, for example, state and local traffic laws, including speed limits, passing rules, ability to turn at a red light, and yielding right of way. In one embodiment, regional laws file 164 includes a database that comprises a set of regional laws and a set of defined regions, wherein the database indicates which laws apply in which regions, as in a two-dimensional table or array. In one embodiment, server computer 160 may periodically update regional laws file 164 via network 110.

Regional habits file 166 is a collection of information describing various regional traffic habits that characterize drivers in that region but are not explicitly detailed in regional laws file 164. Regional habits file 166 can include, for example, regional habits, such as how multi-way stop signs are handled, regionally acceptable deviations from the speed limit, passing etiquette, aggressiveness when merging, distance between cars, turn signal timing, use of turn signals, stopping habits, accelerating habits, turning habits, response to emergency vehicles, and customs relating to yielding right of way. In general, regional habits file 166 can include any information that describes how drivers in a region behave in certain situations. In various embodiments, regional habits file 166 can be a database that includes a set of regional driving habits and a set of defined regions, wherein the database indicates to which regions a particular driving habit applies, as in a two-dimensional table or array. In one embodiment, server computer 160 may periodically update regional habits file 166 via network 110.

Regional operating mode generator 168 is software residing on server computer 160 that instructs vehicle sensors, such as sensor system 130 on vehicle 120, to collect data on manually operated vehicles in a defined region, and synthesizes the data with regional driving laws in order to generate a regional operating mode for the defined region. Regional operating mode generator 168 transmits the regional operating mode to autonomous vehicles, which can then be used in combination with propulsion system 122, control system 124, and onboard computer system 128 to control the behavior of vehicle 120 so that vehicle 120 operates with substantially similar behavior to manually operated vehicles in the region. In various embodiments, a region can be any geographic area in which drivers exhibit similar driving habits. For example, a region can be as large as several states or as small as a single street or neighborhood.

Experimentation and update module 170 is software residing on server computer 160 that generates experimental changes to a regional operating mode and transmits instructions to one or more autonomous vehicles, such as vehicle 120, and change the regional driving mode according to the generated change. Experimentation and update module 170 collects data on the results of the generated experimental changes and updates the regional operating mode according to the results.

Emotion detection system 172 is an example system of hardware and software components that collect data on the results of generated experimental changes and transmits the data to experimentation and update module 170 for analysis. In an example embodiment, emotion detection system 172 includes one or more cameras that focus on the facial expressions of an operator of a manually operated vehicle. In the example embodiment, the camera captures images of the operator's facial expression and feeds the image to facial analysis software included in emotion detection system 172 that analyzes the image to determine if the experimental change in regional driving mode elicited a positive or negative response from manually operated vehicle drivers. In other embodiments, emotion detection system 172 can include one or more microphones configured to detect the sounding of an automobile horn.

Figure 2:
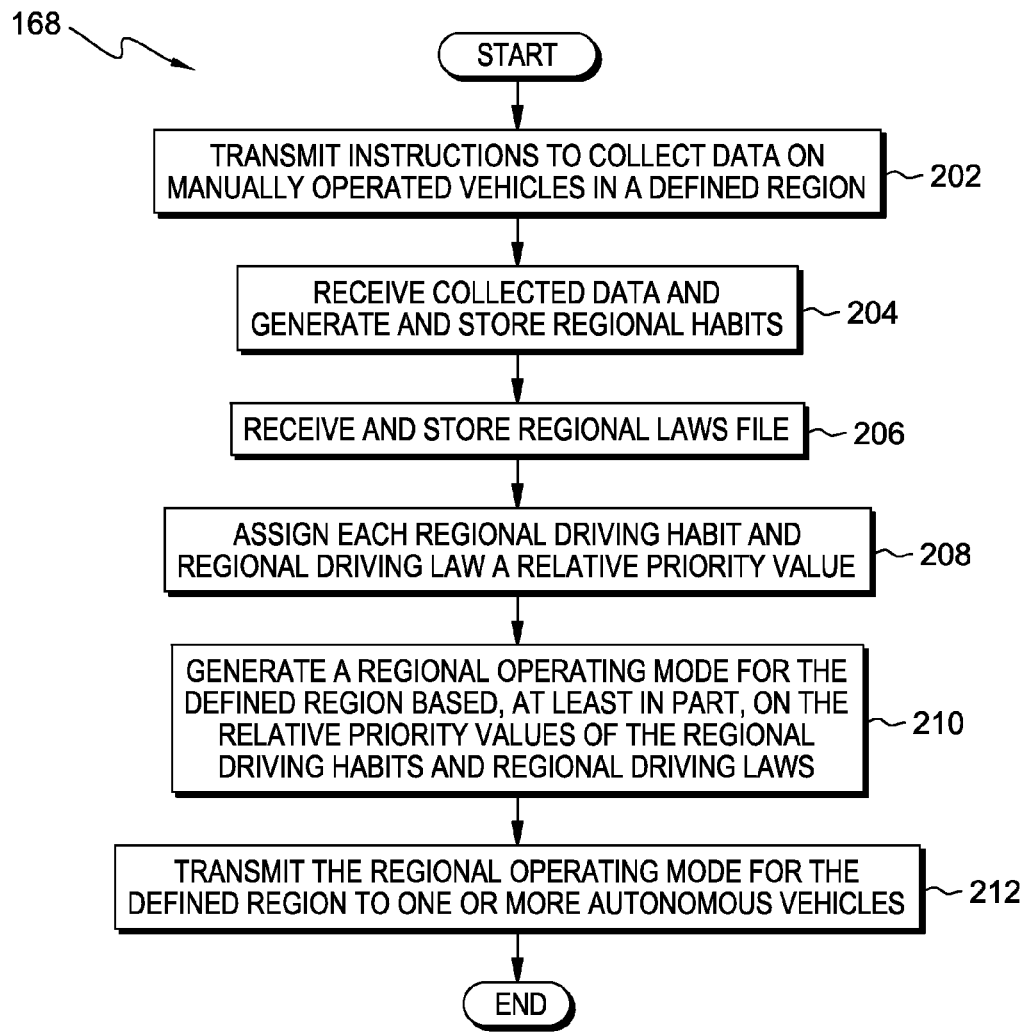
FIG. 2 is a flowchart depicting operational steps of a regional operating mode generator, operating on a server computer within the autonomous vehicle environment of FIG. 1, in accordance with an embodiment of the present invention.

FIG. 2 is a flowchart depicting operational steps of regional operating mode generator 168, in accordance with an embodiment of the present invention.

Regional operating mode generator 168 transmits instructions to collect data on manually operated vehicles in a defined region (step 202). In an embodiment, regional operating mode 168 transmits instructions to onboard computing system 128 via network 110 to observe manually operated vehicles near vehicle 120 using one or more sensors included in sensor system 130. For example, regional operating mode generator 168 can instruct vehicle 120 to collect speed information on manually operated vehicles in the region using sensor system 130. Vehicle 120 can use an on board RADAR or LIDAR system to determine the speed of manually operated vehicles near vehicle 120. In another embodiment, vehicle 120 uses an onboard camera system to determine the distance between manually operated vehicles. In another embodiment, sensor system 130 works in conjunction with control system 124 to collect data on manually operated vehicles in the defined region. For example, a camera system in sensor system 130 can determine that a manually operated vehicle is merging into the same lane as vehicle 120 within a determined distance which is below a threshold and then apply the brakes in control system 124 above a certain threshold. Based on this sequence of events, sensor system can transmit the information to onboard computer system 128 for integration with regional habits file 166. This example is useful in determining the aggressiveness that drivers exhibit when merging in the defined region. In some embodiments, the regional operating mode generator 168 can send the instructions to multiple autonomous vehicles operating in the same region.

Regional operating mode generator 168 receives the collected data and then generates and stores regional habits based, at least in part, on the collected data (step 204). In various embodiments, onboard computer system 128 transmits the collected data to server computer 160 via network 110. In an embodiment, server computer 160 analyzes the data to generate regional driving habits. The analysis used to create a regional driving habit can vary depending on the driving habit being analyzed. For example, some habits, such as speed and timing of turn signal usage, may include an average of all of the data collected for that driving trend. Other types of analysis can be more sophisticated, such as, taking into account the type of vehicle being observed (make and model), the registration of the vehicle (inside the defined region or outside of it), and/or environmental factors (e.g., traffic density, weather factors, time or day, etc.). In various embodiments, the regional habit created during the analysis can be stored in a single database file such as regional laws file 164 in storage 162.

In an alternative embodiment, onboard computer system 128 can analyze raw data generated by observing manually operated vehicles in order to generate a regional driving habit (e.g., a mean or median value for a particular driving characteristic). For example, onboard computer system 128 can calculate the average speed over the posted speed limit at which drivers in the region travel. Server computer 160 can receive the driving habit value from vehicle 120 and incorporate one or more driving habits into a regional habits file, such as regional habits file 166.

Regional operating mode generator 168 receives and stores regional laws file 164 for the defined region (step 206). In various embodiments, regional laws file 164 is a collection of regional laws for the defined region. Regional laws file 164 can be generated based on state and local laws available on, for example, the Internet. In some embodiments, regional laws file 164 can be generated by state officials, local officials, law enforcement officials, insurance agencies, or any other entity capable of accessing the regional traffic laws and distilling them into a set of distinct rules for operating a vehicle in the defined region. In some embodiments, vehicles 120 and 140 can supplement regional laws by, for example, recognizing traffic signs such as speed limit signs and associating the speed limit with the specific location of the sign which can be determined, for example, with a GPS device or camera.

Regional operating mode generator 168 assigns each regional driving habit and each regional driving law for the defined region a relative priority value (step 208). Priority values indicate the relative importance of a regional driving habit compared to other habits, as well as regional laws. In some embodiments, each regional driving habit and each regional law can be assigned a number, wherein the numbers indicate the precedence of the habit or law to which it is assigned. For example, habits and laws with a priority value of one can indicate those habits and laws the disobedience of which can create extremely unsafe driving conditions in the region, or are nearly non-existent in the region. On the other hand, a priority value of five can indicate those regional habits and laws which are necessary for safety considerations or are very prevalent in a region. For example, if a regional law indicates a speed limit of sixty (60) miles per hour, but the regional habit is to exceed the speed limit by five miles per hour (i.e., drive 65 miles per hour), then the speed limit law can receive a priority value of two (2), indicating relatively low priority, while the regional habit of exceeding the speed limit by five miles per hour can receive a priority value of five (5), indicating the prevalence of the habit in the region. In various embodiments, the determination of relative priority values can be based on a number of factors including, but not limited to, statistical factors (e.g., spread of the data and standard deviation of the data) and external data (e.g., the number of speeding tickets issued in a defined region for exceeding the speed limit by a given amount).

Regional operating mode generator 168 generates a regional operating mode based, at least in part, on the relative priority values of the regional driving habits and regional driving laws (step 210). The regional operating mode is a complete set of driving instructions which indicate how vehicles 120 and 140 should operate in a defined region. In various embodiments, the regional operating mode can include a set of regional laws and regional habits that indicate how autonomous vehicles operate in the defined region. In some embodiments, the regional operating mode includes instructions for the control of propulsion system 122 and control system 124, based on inputs received from sensor system 130. For example, if sensor system 130 determines that the posted speed limit in the immediate area is 55 miles per hour, the weather is fair, the road conditions are dry, and that the regional operating mode indicates that, in order to maintain a safe operating environment, automated vehicle 120 should exceed the posted speed limit by five miles per hour in the defined region with good driving conditions, then onboard computer system 128 instructs propulsion system to accelerate to 60 miles per hour.

In various embodiments, the regional operating mode can include a set of variables, wherein each variable represents a driving characteristic that is numerically measurable using the various sensors included in sensor system 130. Examples of variables that can be included in the set are speed, turn signal timing, distance between cars at various speeds, etc. The numerical values associated with the variables can be manipulated to alter the behavior of vehicle 120 in different regions.

Regional operating mode generator 168 transmits the regional operating mode to one or more autonomous vehicles operating in or near the defined region (step 212). In various embodiments, regional operating mode generator transmits the regional operating mode to onboard computing systems of one or more autonomous vehicles via network 110. In some embodiments, the regional operating mode is stored in a local memory on the autonomous vehicle, which may be included in onboard computer system 128. In some embodiments, transmission of the regional operating mode can be based on the GPS coordinates of the autonomous vehicle. For example, when an autonomous vehicle enters a certain radius around the region (e.g., fifty miles), then the autonomous vehicle can transmit a request for an updated set of regional operating modes for nearby regions. Responsive to this request, regional operating mode generator 168 can send the regional operating mode for all regions that are at least partially within fifty miles of the autonomous vehicle.

Figure 3:
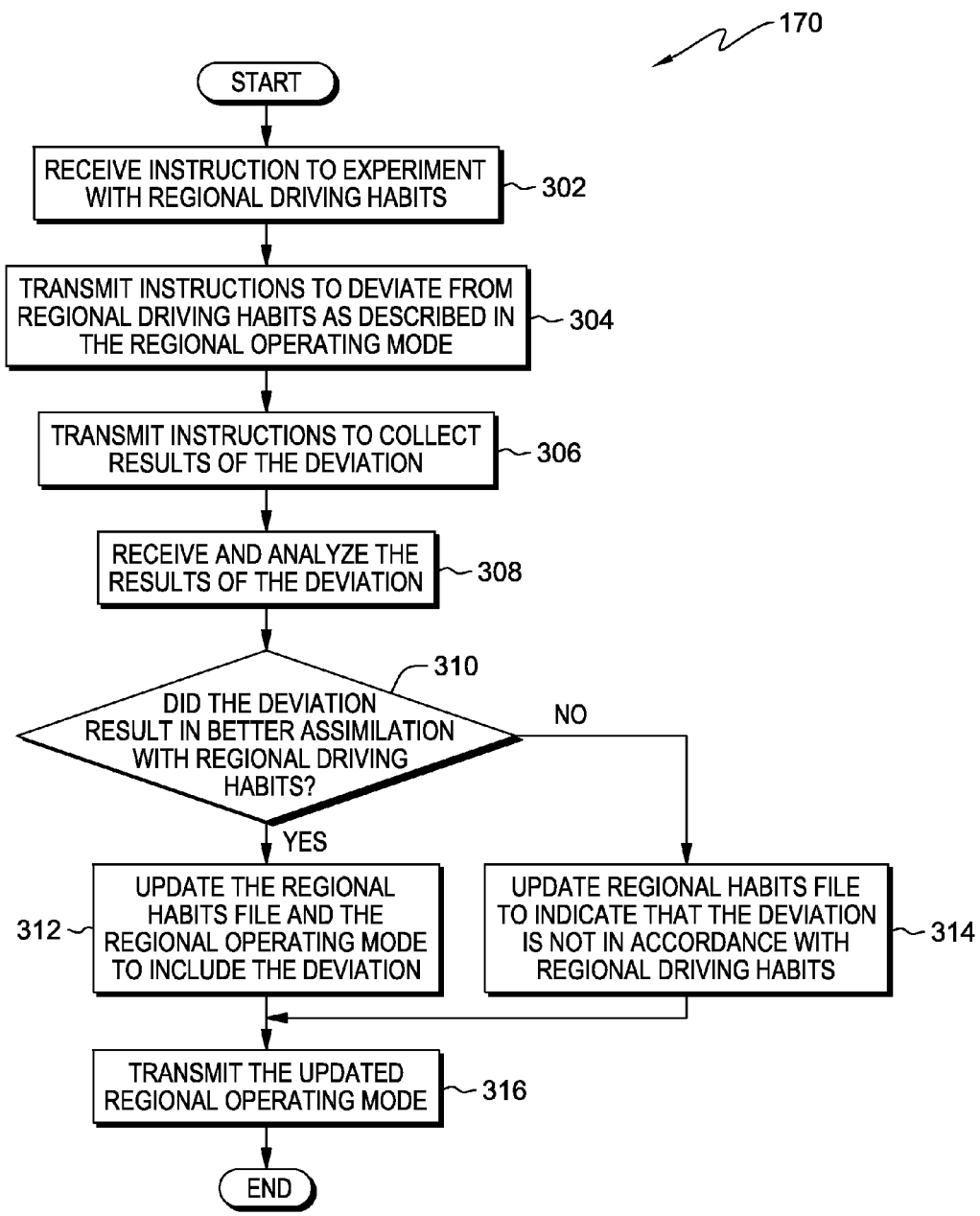
FIG. 3 illustrates operational steps of an experimentation and update module, operating on a server computer within the autonomous vehicle environment of FIG. 1, in accordance with an embodiment of the present invention.

FIG. 3 illustrates operational steps of experimentation and update module 170, operating on a server computer within the environment of FIG. 1, in accordance with an embodiment of the present invention. Experimentation and update module 170 enables server computer 160 to perform automated refining of the regional operating mode created by regional operating mode generator 168. Initially, server computer 160 creates a regional operating mode and transmits the regional operating mode to one or more automated vehicles, for example, by performing the steps of regional operating mode generator 168, as described in FIG. 2.

Experimentation and update module 170 receives an instruction to experiment with regional driving habits (step 302). Experimentation with the regional driving habits is a mechanism to maintain up to date information on regional driving habits, as well as to refine existing regional driving habits by increasing the data pool from which the regional operating mode is determined. The instruction to experiment can be initiated by, for example, a passenger in an autonomous vehicle, an external computer system connected to server computer 160 via network 110, or periodic initialization of experimentation built into the functionality of experimentation and update module 170. Experimentation and update module 170 collects additional data in order to create a more refined regional operating mode and to capture changes in regional driving habits that occur over time. In various embodiments, a passenger can input the instruction to experiment to experimentation and update module 170 by entering a command through user interface 126. Onboard computer system 128 can then transmit the instruction to server computer 160 via network 110. In other embodiments, experimentation and update module 170 may include program instructions to run at regular intervals of time and may, therefore, initiate itself to experiment with regional driving habits.

Experimentation and update module 170 transmits instructions to onboard computer system 128 to instruct vehicle 120 to deviate from regional driving habits, as described in the regional operating mode (step 304). In an embodiment, the instruction to deviate includes a specific habit with which to experiment (e.g., speeding, merging, use of turn signal, etc.). In various embodiments, the level or amount of deviation can be included in order to both provide useful results and in order to maintain the safety of passengers and drivers. For example, the amount of deviation may be based on a statistical analysis, such as standard deviation, or based on defined limits, such as, not exceeding the speed limit by more than ten miles per hour regardless of what the standard deviation is. In other embodiments, where the number of possible behaviors is limited, the experimental behavior may be selected from a list of possible behaviors. For example, when encountering a red light at an intersection where vehicle intends to make a right hand turn, only two possible options exist: "turn right on red" and "wait until the light is green before turning." In this example, the number of possible behaviors is limited and, therefore, no additional statistical analysis is needed. Computing system 128 can choose the behavior that is the opposite of the previously determined regional habit for this particular situation.

Experimentation and update module 170 transmits instructions to collect results of the deviation (step 306). In various embodiments, experimentation and update module 170 transmits instructions to vehicle 120 via network 110 to collect data on the reaction of the deviation and transmit the data back to server computer 160. In various embodiments, vehicle 120 can use any of the sensors included in sensor system 130 to collect data that indicates the reaction of manually operated vehicles in the region to the deviation in behavior. In an embodiment, vehicle 120 can use a RADAR or LIDAR system to detect a manually operating vehicle braking sharply in response to the deviation. In another embodiment, sensor system 130 can include a microphone that is capable of detecting a car horn. In some embodiments, sensor system 130 includes a camera that can take pictures of the facial expression(s) of drivers of manually operated vehicles for analysis by facial recognition software, such as emotion detection system 172. In an embodiment, the manually operated vehicle includes a camera system and/or other physiological detection systems, such as, heart rate monitors and pressure sensors in the steering wheel to detect changes in grip strength for detecting reactions to deviations. In this embodiment, the manually operated vehicle, such as vehicle 140 connects to vehicle 120 and/or server computer 160, and can transmit the result of local reaction tests for analysis by experimentation and update module 170. In this embodiment, vehicle 120 collects data from nearby vehicles in the region regarding the effect of a particular deviation from the regional operating mode on drivers of manually operated vehicles.

Experimentation and update module 170 receives and analyzes the results of the deviation (step 308). Experimentation and update module 170 performs an analysis of the data received following the deviation from the regional operating mode with the goal of determining if the deviation elicited positive reactions from drivers of manually operated vehicles and can be used to refine the regional operating mode to better describe regional driving habits. In various embodiments, analyzing the results of the data collected on a particular deviation can include detecting whether a driver honked a horn in response to the deviation, or whether a RADAR or LIDAR unit detected a sharp braking, acceleration, or swerving action in a manually operated vehicle.

In an embodiment where vehicle 120 or the manually operated vehicle collected images of the driver's and/or passenger's facial expressions, the images can undergo further analysis in order to determine whether the reaction was positive or not. As one skilled in the art will recognize, various mechanisms for analyzing facial expressions exist. In some embodiments, emotion detection system 172 can be a program designed to detect emotions based on facial expressions. For example, emotion detection system 172 can analyze images of facial expressions to detect such emotions as joy, fear, shock, surprise, and/or anger. In some embodiments, certain emotions can be associated with different results of the analysis of the deviation data. For example, emotions such as surprise, anger, and fear may be considered negative reactions while emotions such as joy can be considered positive reactions.

Experimentation and update module 170 determines whether the deviation resulted in better assimilation with regional driving habits (decision block 310). In various embodiments, experimentation and update module 170 determines that positive and/or neutral reactions from drivers in response to a deviation indicates that the behavior in the deviation is consistent with regional driving habits and may, therefore, be included in the regional operating mode. On the other hand, experimentation and update module 170 can determine that negative reactions from drivers and extreme or unexpected reactions in driving style of manually operated vehicles indicate that the deviation was not consistent with regional driving habits. If experimentation and update module 170 determines that the deviation resulted in better assimilation with regional driving habits (decision block 310, YES branch), then experimentation and update module 170 updates regional habits file 166 and the regional operating mode to include the deviation behavior in step 312. In one embodiment, updating regional habits file 166 can include replacing information detailing regional driving habit with new information detailing the same or a different habit. In another embodiment, updating regional habits file 166 can comprise changing the priority value associated with an existing regional driving habit.

If experimentation and update program 170 determines that the deviation did not result in better assimilation with regional driving habits (decision block 310, NO branch), then experimentation and update module 170 updates regional habits file 166 and the regional operating mode to indicate that the deviation is not in accordance with regional driving habits in step 314. In an embodiment, indicating that the deviation is not in accordance with regional driving habits can include updating one or more priority values associated with one or more regional driving habits included in regional habits file 166. In some embodiments, experimentation and update module 170 can also maintain a list of deviations that have been attempted so that similar deviations do not repeat more than once in a short period of time.

Experimentation and update module 170 transmits the updated regional operating mode to one or more autonomous vehicles operating in or near the defined region (step 316). In various embodiments, experimentation can disseminate the updated regional operating mode to one or more autonomous vehicles operating in or around the defined region via network 110.

Figure 4:
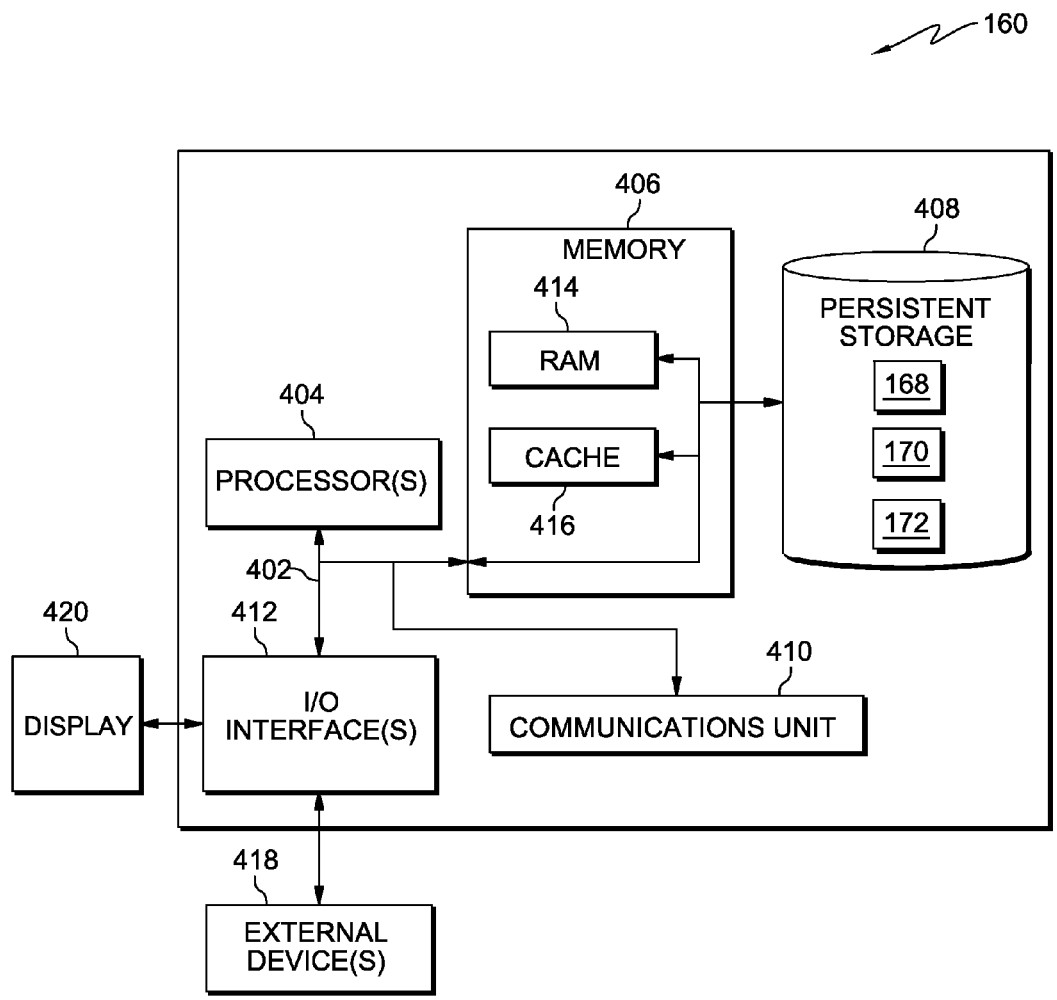
FIG. 4 depicts a block diagram of components of the server computer executing the regional operating mode generator and the experimentation and update module, in accordance with an embodiment of the present invention.

FIG. 4 depicts a block diagram of components of server computer 160, in accordance with an illustrative embodiment of the present invention. It should be appreciated that FIG. 4 provides only an illustration of one implementation, and does not imply any limitations with regard to the environments in which different embodiments may be implemented. Many modifications to the depicted environment may be made.

Server computer 160 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Regional operating mode generator 168 and experimentation and update module 170 are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of vehicles 120 and 140. In these examples, communications unit 410 includes one or more network interface cards. Communications unit 410 may provide communications through the use of either or both physical and wireless communications links. Regional operating mode generator 168 and experimentation and update module 170 may be downloaded to persistent storage 408 through communications unit 410.

I/O interface(s) 412 allows for input and output of data with other devices that may be connected to server computer 160. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., regional operating mode generator 168 and experimentation and update module 170, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
by program instructions on a computing device,
receiving data detailing operation of a plurality of at least partially manually operated automobiles;
determining one or more trends in the operation of the plurality of at least partially manually operated automobiles, based at least in part on the data detailing the operation of the plurality of manually operated vehicles;
generating one or more operational rules that are valid for a first geographic area, based, at least in part, on the one or more trends; and
transmitting the one or more operational rules to one or more at least semi-autonomous vehicles.

2. The method of claim 1, further comprising:
transmitting a first set of information to the one or more at least semi-autonomous vehicles, wherein the first set of information instructs the one or more semi-autonomous vehicles to deviate from at least one of the one or more operational rules;
receiving data detailing one or more reactions of one or more operators of a second plurality of at least partially manually operated vehicles operating within the first geographic area; and
updating at least one of the one or more operational rules, based at least in part on the data detailing the one or more reactions.

3. The method of claim 2, wherein collecting data detailing one or more reactions comprises:
detecting one or more images of a facial expression; and
analyzing the one or more images of the facial expression to determine an operator response, wherein the analysis comprises performing facial expression recognition to determine a sentiment associated with the operator response.

4. The method of claim 3, further comprising:
responsive to determining that the sentiment associated with the operator response is positive, updating the one or more operational rules to reflect the positive operator response to the deviation from the at least one of the one or more operational rules.

5. The method of claim 4, further comprising:
responsive to determining that the sentiment associated with the operator response is neutral, updating, by one or more computer processors, the one or more operational rules to reflect the neutral operator response to the deviation from the at least one of the one or more operational rules as if the operator response was positive.

6. The method of claim 3, further comprising:
responsive to determining that the driver response is negative, updating the one or more operational rules to reflect the negative operator response to the deviation from the at least one of the one or more operational rules.

7. The method of claim 6, wherein determining that the driver response is negative includes determining the sentiment associated with the operator response includes at least one of fear, shock, surprise, and anger.

8. The method of claim 1, wherein generating the one or more operational rules comprises:
assigning a first set of one or more priority values to the one or more trends;
assigning a second set of one or more priority values to one or more traffic laws; and
determining the one or more operational rules, based at least in part on the first set of one or more priority values and the second set of one or more priority values.

9. The method of claim 8, further comprising:
updating the first set of one or more priority values based at least in part on determining that a sentiment associated with an operator response is positive.

10. A computer program product comprising:
one or more computer-readable storage media and program instructions stored on the one or more computer-readable storage media, wherein the one or more computer-readable storage media is not a signal, the program instructions comprising:
program instructions to receive data detailing operation of a plurality of at least partially manually operated automobiles;
program instructions to determine one or more trends in the operation of the plurality of at least partially manually operated automobiles, based at least in part on the data detailing the operation of the plurality of manually operated vehicles;
program instructions to generate one or more operational rules that are valid for a first geographic area, based, at least in part, on the one or more trends; and
program instructions to transmit the one or more operational rules to one or more at least semi-autonomous vehicles.

11. The computer program product of claim 10, wherein the program instructions further comprise:
program instructions to transmit a first set of information to the one or more at least semi-autonomous vehicles, wherein the first set of information instructs the one or more semi-autonomous vehicles to deviate from at least one of the one or more operational rules;
program instructions to receive data detailing one or more reactions of one or more operators of a second plurality of at least partially manually operated vehicles operating within the first geographic area; and
program instructions to update at least one of the one or more operational rules, based at least in part on the data detailing the one or more reactions.

12. The computer program product of claim 11, wherein the program instructions to collect data detailing one or more reactions comprises:

program instructions to detect one or more images of a facial expression; and program instructions to analyze the one or more images of the facial expression to determine an operator response, wherein the analysis comprises performing facial expression recognition to determine a sentiment associated with the operator response.

13. The computer program product of claim 12, wherein the program instructions further comprise:

responsive to determining that the sentiment associated with the operator response is positive, program instructions to update the one or more operational rules to reflect the positive operator response to the deviation from the at least one of the one or more operational rules.

14. The computer program product of claim 12, wherein the program instructions further comprise:

responsive to determining that the driver response is negative, program instructions to update the one or more operational rules to reflect the negative operator response to the deviation from the at least one of the one or more operational rules.

15. The computer program product of claim 12, wherein the program instructions to generate the one or more operational rules comprises:

program instructions to assign a first set of one or more priority values to the one or more trends;

program instructions to assign a second set of one or more priority values to one or more traffic laws; and program instructions to determine the one or more operational rules, based at least in part on the first set of one or more priority values and the second set of one or more priority values.

16. A computer system comprising:

one or more computer processors;

one or more computer-readable storage media, wherein the one or more computer-readable storage media is not a signal;

program instructions stored on the computer-readable storage media for execution by at least one of the one or more processors, the program instructions comprising:

program instructions to receive data detailing operation of a plurality of at least partially manually operated automobiles;

program instructions to determine one or more trends in the operation of the plurality of at least partially manually operated automobiles, based at least in part on the data detailing the operation of the plurality of manually operated vehicles;

program instructions to generate one or more operational rules that are valid for a first geographic area, based, at least in part, on the one or more trends; and program instructions to transmit the one or more operational rules to one or more at least semi-autonomous vehicles.

17. The computer system of claim 16, wherein the program instructions further comprise:

program instructions to transmit a first set of information to the one or more at least semi-autonomous vehicles, wherein the first set of information instructs the one or more semi-autonomous vehicles to deviate from at least one of the one or more operational rules;

program instructions to receive data detailing one or more reactions of one or more operators of a second plurality of at least partially manually operated vehicles operating within the first geographic area; and program instructions to update at least one of the one or more operational rules, based at least in part on the data detailing the one or more reactions.

18. The computer system of claim 17, wherein the program instructions to collect data detailing one or more reactions comprises:

program instructions to detect one or more images of a facial expression; and program instructions to analyze the one or more images of the facial expression to determine an operator response, wherein the analysis comprises performing facial expression recognition to determine a sentiment associated with the operator response.

19. The computer program product of claim 18, wherein the program instructions further comprise:

responsive to determining that the sentiment associated with the operator response is positive, program instructions to update the one or more operational rules to reflect the positive operator response to the deviation from the at least one of the one or more operational rules.

20. The computer program product of claim 18, wherein the program instructions further comprise:

responsive to determining that the driver response is negative, program instructions to update the one or more operational rules to reflect the negative operator response to the deviation from the at least one of the one or more operational rules.

* * * * *